United States Patent [19]

Rothenberg et al.

[11] Patent Number: 5,688,403
[45] Date of Patent: Nov. 18, 1997

[54] REMOVAL OF METAL IONS FROM SOLUTION

[75] Inventors: Alan S. Rothenberg, Wilton; Roderick Glyn Ryles, Milford, both of Conn.

[73] Assignee: Cytec Technology Corp., Wilmington, Del.

[21] Appl. No.: 610,102

[22] Filed: Feb. 29, 1996

[51] Int. Cl.$^6$ ........................................... C02F 1/56
[52] U.S. Cl. .................. 210/727; 210/734; 210/735; 210/912
[58] Field of Search ................................ 210/725, 727, 210/728, 734, 735, 912, 913, 914

[56] References Cited

U.S. PATENT DOCUMENTS

| | | | |
|---|---|---|---|
| 3,947,354 | 3/1976 | Swanson et al. | 210/727 |
| 4,480,067 | 10/1984 | Vio et al. | 524/446 |
| 4,532,046 | 7/1985 | Meunier et al. | 210/698 |
| 4,536,296 | 8/1985 | Vio | 252/8.5 C |
| 4,569,768 | 2/1986 | McKinley | 210/727 |
| 4,587,306 | 5/1986 | Vio et al. | 525/354 |
| 4,758,353 | 7/1988 | Spence et al. | 210/725 |
| 4,767,540 | 8/1988 | Spitzer et al. | 210/728 |
| 5,093,091 | 3/1992 | Dauplaise et al. | 423/112 |
| 5,128,420 | 7/1992 | Domb et al. | 525/377 |
| 5,368,745 | 11/1994 | Rothenberg et al. | 210/734 |

OTHER PUBLICATIONS

Domb et al, "The Synthesis of Poly(hydroxamic Acid) from Poly(acrylamide)", 1988 Journal of Polymer Science Part A: Polymer Chemistry vol. 26, pp. 2623–2630.

*Primary Examiner*—Peter A. Hruskoci
*Attorney, Agent, or Firm*—Frank M. Van Riet

[57] ABSTRACT

Metal ions are removed from solution by contacting the solution with a combination of a water-soluble cationic polymer and a water-soluble polymer containing pendant hydroxamic acid or salt groups.

6 Claims, No Drawings

REMOVAL OF METAL IONS FROM SOLUTION

BACKGROUND OF THE INVENTION

The presence of metal ions in water being discharged from commercial operations such as manufacturing plants, municipal treatment plants, refineries, metal plating operations, etc., has presented a major environmental problem for years. Current governmental regulations prevent the discharge of such waters into rivers, lakes, oceans, etc., and, therefore, extensive research has been conducted and is ongoing relating to the removal of metal ions from water which is to be discharged into the environment. One of the proposed systems for metal ion removal from aqueous solution comprises the use of an insoluble matrix such as an ion exchange column, however, such columns are very expensive to build, maintain and regenerate and have not found wide-spread use.

The use of hydroxamated polymers to complex metal ions such as iron and copper is well known as represented by Domb et al, "Journal of Polymer Science": Part A: Polymer Chemistry, Vol. 26, pp. 2623–2630 (1988). See also U.S. Pat. No. 5,128,420. The authors, however, do not describe how to remove the ion complexes from solution.

SUMMARY OF THE INVENTION

The present invention is directed to a method of removing metal ions from a solution thereof wherein a combination of a water-soluble cationic polymer and a water-soluble polymer containing pendant hydroxamic acid or salt groups is added thereto.

This invention provides a simple, economical method for removing metal ions from solution thereby enabling the water to be recycled or discarded without detrimental process or ecological consequences.

DESCRIPTION OF THE INVENTION INCLUDING PREFERRED EMBODIMENTS

This invention relates to a method of removing metal ions, particularly heavy metal ions such as iron, copper, lead, zinc, nickel and the like from solution, wherein the solution is contacted with, in sequence, 1) a water-soluble polymer containing pendant hydroxamic acid or salt groups and 2) a water-soluble, cationic polymer and separating the metal ions from said solution.

The sequence of addition of polymer 1) and polymer 2) is critical. That is to say, the hydroxamic acid or salt group containing polymer must be added first and the cationic polymer thereafter, with sufficient time between the additions such that the first polymer remains in contact with the metal solution long enough to complex the metal ions.

The two polymers should be added such that the mole ratio of one to the other ranges from about 3 to 1 to about 1 to 3, respectively, preferably from about 2 to 1 to about 1 to 2, respectively, more preferably form about 1.5 to 1 to 1 to 1.5, respectively.

The total amount of polymers 1) and 2), used should be that which is effective, on the one hand, such that polymer 1) complexes the metal ion being removed and, on the other hand, such that polymer 2) flocculates the polymer 1) -metal ion complex. Generally, amounts ranging from about 25 to about 750 parts per million of each polymer may be used, preferably about 50 to about 650 ppm, although it is to be understood that higher or lower amounts of either polymer may advantageously be used.

The water-soluble, cationic polymers are generally those polymers are generally those polymers which are known flocculants. They are produced from such cationic monomers as the diallyldialkylammonium halides, such as diallyldimethylammonium chloride; acryloxyethyltrimethylammonium chloride; (meth)acrylates of N,N-dialkylaminoalkanol compounds and quaternaries and salts thereof, such as N,N-dimethylaminoethylacrylate methylchloride salt; N,N-dialkylaminoalkyl(meth) acrylamides and salts and quaternaries thereof, such as N,N-dimethylaminoethylacrylamide; methacrylamidopropyltrimethylammonium chloride; 1-methacryloyl-4-methyl piperazine and the like. Such cationic monomers are generally of the following formula:

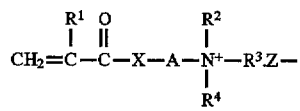

where $R^1$ is hydrogen or methyl, $R^2$ is hydrogen or lower alkyl of $C_1$ to $C_4$, $R^3$ and/or $R^4$ are hydrogen, alkyl of $C_1$ to $C_{12}$, aryl or hydroxyethyl and $R^2$ and $R^3$ or $R^2$ and $R^4$ can combine to form a cyclic ring containing one or more hereto atoms, Z is the conjugate base of an acid, X is oxygen or $-NR^1-$ and A is an alkylene group of $C_1$ to $C_{12}$; or the formula:

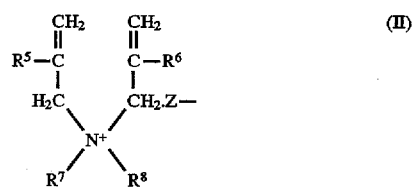

where $R^5$ and $R^6$ are hydrogen or methyl, $R^7$ is hydrogen, alkyl of $C_1$ to $C_2$ or benzyl, and $R^8$ is hydrogen, alkyl of $C_1$ to $C_{12}$ benzyl or hydroxyethyl; and Z is as defined above.

Comonomers, suitable to copolymerization with the cationic monomers of Formulae I or II above, generally comprise acrylamide; methacrylamide; N-alkylacrylamides such as N-methylacrylamide; N,N-dialkylacrylamides; such as N,N'-dimethylacrylamide; methyl acrylate; methyl methacrylate; acrylonitrile; N-vinylmethylacetamide or formamide; vinyl acetate, N-vinyl pyrrolidone, and the like.

These ethylenically unsaturated monomers may also be copolymerized to produce cationic copolymers. Preferably, a nonionic monomer, such as an acrylamide is copolymerized with a cationic comonomer to produce a cationic copolymer. Acrylamide copolymers, useful in the practice of the process of this invention, comprise from about 1 to about 99 parts, by weight, based on the total weight of the polymer, of acrylamide monomer and from about 99 to about 1 part, by weight, same basis, of the cationic comonomer. Preferably, the acrylamide copolymer comprises from about 10 to about 99 parts, by weight, acrylamide monomer and from about 90 to about 1.0 part, by weight, cationic comonomer, same basis. The weight average molecular weight of the cationic polymer should range from about 10,000 to about 20,000,000.

Any water-soluble hydroxamic acid or salt group-containing polymer may be used in the process of the present invention. The useful polymers can best be exemplified by those containing pendant groups of the Formula III:

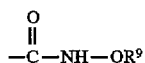

wherein $R^9$ is hydrogen or an cation. These polymers are well known in the art and can be derived from polymers containing pendant ester, amide, anhydride, nitrile, etc., groups by the reaction thereof with a hydroxylamine or its salt.

Exemplary of the polymers which may be hydroxamated for use in the process of the present invention are acrylic, methacrylic, crotonic, etc.; acid ester polymers such as polymers produced from the polymerization of methyl acrylate, ethyl acrylate, t-butyl acrylate, methyl methacrylate, ethyl methacrylate, cyclohexyl methacrylate, dimethyl aminoethyl methacrylate, dimethyl aminoethyl acrylate, methyl crononate, etc., polymers of maleic anhydride and esters therof, and the like; nitrile polymers such as those produced from acrylonitrile, etc.; amide polymers such as those produced from acrylamide, methacrylamide and the like.

Hydroxamated polymers are well known to those skilled in the art and are specifically disclosed, as are methods for their production, in U.K. Patent Application 217,127 and U.S. Pat. Nos. 3,345,344; 4,480,067; 4,532,046; 4,536,296 and 4,587,306, all of which are hereby incorporated herein by reference. Generally, these hydroxamated polymers may be produced by reacting the polymer containing the pendant reactive group, in solution, with a hydroxylamine or its salt at a temperature ranging from about 10° C. to 100° C. for several hours. From about 1–90% of the available pendant reactive groups of the polymer may be replaced by hydroxamic groups in accordance with said procedures.

In addition to reaction of a hydroxylamine or its salt with a polymer solution, a polymer latex may be reacted directly with a hydroxylamine or its salt. The latex may be, e.g., a copolymer of acrylamide and methyl acrylate or a copolymer of acrylic acid and methyl acrylate. In these cases, the hydroxylamine or its salt reacts primarily with the ester groups to form hydroxamic acid groups.

Inverse emulsions made of, for example, aqueous polyacrylamide or acrylamide/acrylic acid copolymers dispersed in oil can also be reacted directly with a hydroxylamine or its salt to give very high molecular weight polymers containing hydroxamic acid groups, all of which function efficiently in the process of the present invention.

The degree of hydroxamation, i.e., the concentration of Formula III units in the polymers useful herein, may range from about 1 to about 90 mole percent, preferably from about 5 to about 75 mole percent and, most preferably, from about 10 to about 50 mole percent.

Suitable hydroxylamine salts include the sulfates, sulfites, phosphates, perchlorates, hydrochlorides, acetates propionates and the like. The pH of the solution is adjusted to about 3–9, preferably over about 6.0, by means of acid or base addition to the solution.

Any water-soluble polymer may be used in the present process which, after hydroxamation, performs to complex metal ions. Thus, homopolymers, copolymers, terpolymers, etc., of the above exemplified monomers may be used. Suitable comonomers which, by copolymerization, may form, for example, up to about 95 mole percent of the polymers useful herein can include acrylic acid, sodium acrylate, methacrylic acid, maleic anhydride, vinyl acetate, vinyl pyrrolidone, butadiene, styrene, as well as others of the above enumerated ester, amides and/or nitriles and the like as is known in the art and is set forth in the above-incorporated patents as long as such copolymers, terpolymer, etc., are water-soluble after hydroxamation. The weight average molecular weight of the polymers useful in the process of the present invention range from about $1 \times 10^4$ to about $3 \times 10^7$.

The following examples are set forth for purposes of illustration only and are not to be construed as limitations on the present invention except as set forth in the appended claims. All parts and percentages are by weight unless otherwise specified.

In the following examples, the test procedure involves the preparation of a solution of the specified metal ion in acetate buffer to pH 6.0, adding the hydroxamated polymer and then the cationic polymer, each with mixing, filtering through an 0.8 micron millipore filter and analyzing for residual metal ion.

In the Examples:

Polymer A=a low weight average molecular weight (Ca. 3000) hydroxamated polyacrylamide with 50–60% hydroxamic acid groups.

Polymer B=polymer similar to Polymer A but having a weight average molecular weight of about 930,000.

Polymer C=polymer similar to Polymer A but having a weight average molecular weight over about 10 million with 27–30% hydroxamic acid groups.

Polymer D=poly (diallyldimethylammonium chloride),

EXAMPLES 1–29

| | Metal in Solution - Copper Initial Conc. - 30.0 PPM | | | | |
|---|---|---|---|---|---|
| Example | Polymer 1 - PPM | Polymer 2 - PPM | pH | Final Conc. | % Removed |
| 1 | D-25 | A-25 | 5.2 | 15.0 | 50.0 |
| 2 | D-50 | A-50 | 5.3 | 5.0 | 83.3 |
| 3 | D-75 | A-75 | 5.6 | 4.2 | 86.0 |
| 4 | D-100 | A-100 | 6.3 | 0.2 | 99.3 |
| 5 | D-125 | A-125 | 8.4 | 0.9 | 97.0 |
| 6 | D-150 | A-150 | 8.7 | 0.9 | 97.0 |
| 7 | D-175 | A-175 | 8.9 | 0.9 | 97.0 |
| 8 | D-200 | A-200 | 9.0 | 0.9 | 97.0 |
| 9 | D-225 | A-225 | 9.1 | 1.1 | 96.3 |
| 10 | D-250 | A-250 | 9.2 | 1.0 | 96.7 |
| 11 | D-125 | A-25 | 8.6 | 30.0 | 0.0 |
| 12 | D-125 | A-50 | 8.5 | 21.0 | 30.0 |
| 13 | D-125 | A-75 | 8.4 | 11.0 | 63.3 |
| 14 | D-125 | A-100 | 8.4 | 4.4 | 85.3 |
| 15 | D-125 | A-125 | 8.5 | 2.4 | 92.0 |
| 16 | D-125 | A-150 | 8.3 | 0.2 | 99.3 |
| 17 | D-125 | A-175 | 8.1 | 0.04 | 99.9 |
| 18 | D-125 | A-200 | 8.0 | 5.0 | 83.3 |
| 19 | D-125 | A-225 | 8.1 | 10.0 | 66.7 |
| 20 | D-125 | A-250 | 7.9 | 20.0 | 33.3 |
| 21 | D-25 | B-25 | 5.9 | 25.0 | 13.8 |
| 22 | D-50 | B-50 | 5.9 | 19.0 | 34.5 |
| 23 | D-100 | B-100 | 5.9 | 11.0 | 62.1 |
| 24 | D-150 | B-150 | 6.0 | 5.0 | 83.3 |
| 25 | D-200 | B-200 | 6.0 | 1.0 | 96.6 |
| 26 | D-250 | B-250 | 6.0 | 2.9 | 90.0 |
| 27 | D-300 | B-300 | 6.1 | 2.8 | 90.3 |
| 28 | D-400 | B-400 | 6.2 | 1.8 | 93.8 |
| 29 | D-500 | B-500 | 6.3 | 1.4 | 95.2 |

EXAMPLES 30–49

Metal In Solution - Lead
Initial Conc. - 27.0 PPM

| Example | Polymer D - PPM | Polymer A - PPM | pH | Final Conc.* | % Removed |
|---|---|---|---|---|---|
| 30 | −25 | −25 | 5.9 | 19.0 | 29.6 |
| 31 | −50 | −50 | 5.9 | 16.0 | 40.7 |
| 32 | −75 | −75 | 5.9 | 5.0 | 81.5 |
| 33 | −100 | −100 | 5.9 | 5.0 | 81.5 |
| 34 | −125 | −125 | 5.9 | 4.0 | 85.2 |
| 35 | −150 | −150 | 6.0 | 3.0 | 88.9 |
| 36 | −175 | −175 | 6.0 | 3.0 | 88.9 |
| 37 | −200 | −200 | 6.0 | 3.0 | 88.9 |
| 38 | −225 | −225 | 6.1 | 3.0 | 88.9 |
| 39 | −250 | −250 | 6.1 | 2.0 | 92.6 |
| 40 | −200 | −200 | 6.1 | 2.3 | 79.1 |
| 41 | −250 | −250 | 6.1 | 2.2 | 80.0 |
| 42 | −300 | −300 | 6.2 | 2.2 | 80.0 |
| 43 | −350 | −350 | 6.3 | 2.1 | 80.9 |
| 44 | −400 | −400 | 6.4 | 2.2 | 80.0 |
| 45 | −450 | −450 | 6.5 | 1.9 | 82.7 |
| 46 | −500 | −500 | 6.6 | 2.0 | 81.8 |
| 47 | −550 | −550 | 6.9 | 1.9 | 82.7 |
| 48 | −600 | −600 | 7.1 | 1.9 | 82.7 |
| 49 | −650 | −650 | 7.5 | 1.8 | 83.6 |

Initial Conc. Examples 40–49 is 11.0 ppm.

EXAMPLES 50–69

Metal in Solution - Zinc
Initial Conc. - 25 PPM

| Example | Polymer D - PPM | Polymer A - PPM | pH | Final Conc.* | % Removed |
|---|---|---|---|---|---|
| 50 | 25 | 25 | 5.9 | 23.0 | 8.0 |
| 51 | 50 | 50 | 5.9 | 20.0 | 20.0 |
| 52 | 75 | 75 | 5.9 | 18.0 | 28.0 |
| 53 | 100 | 200 | 5.9 | 16.0 | 36.0 |
| 54 | 125 | 125 | 5.9 | 14.0 | 44.0 |
| 55 | 150 | 150 | 6.0 | 13.0 | 48.0 |
| 56 | 175 | 175 | 6.0 | 11.0 | 56.0 |
| 57 | 200 | 200 | 6.0 | 10.0 | 60.0 |
| 58 | 225 | 225 | 6.0 | 8.0 | 68.0 |
| 59 | 250 | 250 | 6.1 | 7.0 | 72.0 |
| 60 | 200 | 200 | 6.1 | 3.3 | 68.3 |
| 61 | 250 | 250 | 6.1 | 2.5 | 75.0 |
| 62 | 300 | 300 | 6.2 | 2.2 | 78.8 |
| 63 | 350 | 350 | 6.2 | 2.1 | 79.8 |
| 64 | 400 | 400 | 6.3 | 1.6 | 84.6 |
| 65 | 450 | 450 | 6.4 | 1.3 | 87.5 |
| 66 | 500 | 500 | 6.5 | 1.2 | 88.5 |
| 67 | 550 | 550 | 6.7 | 1.0 | 90.4 |
| 68 | 600 | 600 | 6.9 | 0.9 | 91.3 |
| 69 | 650 | 650 | 7.1 | 0.8 | 92.3 |

Initial Conc. Examples 60–69 is 10.4 ppm.

EXAMPLES 70–79

Metal in Solution - Nickel
Initial Conc. - 8.6 PPM

| Example | Polymer D - PPM | Polymer A - PPM | pH | Final Conc.* | % Removed |
|---|---|---|---|---|---|
| 70 | 25 | 25 | 6.0 | 7.5 | 12.8 |
| 71 | 50 | 50 | 6.0 | 6.4 | 25.6 |
| 72 | 75 | 75 | 6.0 | 5.6 | 34.9 |
| 73 | 100 | 100 | 6.0 | 4.6 | 46.5 |
| 74 | 125 | 125 | 6.0 | 4.2 | 51.2 |
| 75 | 150 | 150 | 6.1 | 3.8 | 55.8 |
| 76 | 175 | 175 | 6.1 | 3.3 | 61.6 |
| 77 | 200 | 200 | 6.1 | 4.0 | 53.5 |
| 78 | 225 | 225 | 6.2 | 2.8 | 67.4 |
| 79 | 250 | 250 | 6.2 | 2.2 | 74.4 |

EXAMPLE 80

Example 10 is again followed except that Polymer A is replaced by an equivalent amount of Polymer B. Excellent separation of copper ion is achieved.

EXAMPLE 81

Example 17 is again followed except that Polymer A is replaced by an equivalent amount of Polymer C. Again, excellent separation of copper ion results.

EXAMPLE 82

Example 5 is again followed except that Polymer D is replaced by an acrylamide/acryloxyethyltrimethyl ammonium chloride copolymer (60/40 mole ratio) having a solution viscosity of 3.3 mPa.s. Similar results are observed.

EXAMPLE 83

Example 25 is again repeated except that Polymer D is replaced by an equivalent amount of a Mannich polyacrylamide having a weight average molecular weight of 3–4× $10^5$. Excellent separation of copper ion results.

EXAMPLE 84

Following the procedure of Example 39 except that polymer A is replaced by an equivalent amount of a 10k weight average molecular weight acrylamide polymer having a 22% hydroxamic acid group content. Excellent separation of lead ion is achieved.

EXAMPLE 85

Equivalent results of zinc ion removal are achieved when Example 69 is followed except that Polymer A is replaced by an equivalent amount of Polymer B and Polymer D is replaced by an equivalent amount of the copolymer (60/40 mole ratio) of Example 82.

EXAMPLE 86

Excellent nickel ion removal is achieved when Polymer A of Example 78 is replaced by an equivalent amount of Polymer C and the concentration of Polymer C and the concentration of Polymer D is doubled.

We claim:

1. A method of removing metal ions from water being discharged from a commercial operation which comprises contacting said water, in sequence, with an effective amount of 1) a water-soluble polymer containing pendant hydroxamic acid or salt groups to complex said metal ions and 2) a water-soluble cationic polymer to flocculate the resultant metal ion complexes and separating the resultant flocculated metal ion complexes from said water, wherein the metal ions are selected from the group consisting of copper, lead, zinc and nickel.

2. A method according to claim 1 wherein polymer 2) is formed from a monomer having the formula

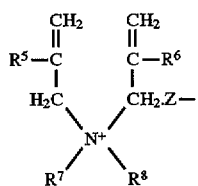
(IV)

wherein $R^5$ and $R^6$ are hydrogen or methyl, $R^7$ is hydrogen, alkyl of $C_1$–$C_{12}$ or benzyl and $R^8$ is hydrogen, alkyl of $C_1$–$C_{12}$, benzyl or hydroxyethyl and Z is the conjugate base of an acid.

3. The method of claim 2 wherein polymer 1) is an hydroxamated acrylamide polymer.

4. The method of claim 1 wherein polymer 1) is an hydroxamated acrylamide polymer.

5. The method of claim 1 wherein polymer 2) is polydiallyldimethylammonium chloride.

6. The method of claim 5 wherein polymer 1) is hydroxamated polyacrylamide having a weight average molecular weight ranging from about $1\times10^4$ to about $3\times10^7$.

* * * * *